Jan. 6, 1970 P. I. BONYHARD ET AL 3,488,645

CONTENT ADDRESSABLE DOMAIN WALL WIRE MEMORY

Filed March 6, 1967 3 Sheets-Sheet 1

INVENTORS P. I. BONYHARD
U. F. GIANOLA
BY Herbert M. Shapiro
ATTORNEY

Jan. 6, 1970 P. I. BONYHARD ET AL 3,488,645

CONTENT ADDRESSABLE DOMAIN WALL WIRE MEMORY

Filed March 8, 1967 3 Sheets-Sheet 3

United States Patent Office 3,488,645
Patented Jan. 6, 1970

3,488,645
CONTENT ADDRESSABLE DOMAIN WALL WIRE MEMORY

Peter I. Bonyhard, Newark, and Umberto F. Gianola, Florham Park, N.J., assignors to Bell Telephone Laboratories, Incorporated, Murray Hill and Berkeley Heights, N.J., a corporation of New York Filed Mar. 8, 1967, Ser. No. 621,586
Int. Cl. G11b 5/00
U.S. Cl. 340—174 10 Claims

ABSTRACT OF THE DISCLOSURE

A domain wall wire memory is adapted for content addressing by the selective movement of domain walls along domain wall wires past a decoding network which generates the addresses of corresponding match words in memory. Binary ones are stored as domain walls in first positions of bit locations in "real" bit planes; binary zeros are stored as domain walls in first positions of bit locations in associated "complementary" bit planes. A propagation field is applied to advance walls in the wires of a real plane or in the associated complementary plane according to whether the corresponding bit of the match character is a "0" or a "1" respectively. A wall reaches the decoding network only when a match occurs.

FIELD OF THE INVENTION

This invention relates to magnetic memory circuits and, more particularly, to such circuits which are addressable by content rather than by location.

Content addressable memories, in general, are intended to reduce accessing time for information retrieval in special purpose memories or to ease the program complexities for the readout of memories in data processing systems. The problem is that content addressing requires a certain amount of logic for each word in memory and that that logic is prohibitively expensive in most implementations.

Accordingly, an object of this invention is a magnetic memory in which the capability of content addressing is provided in a relatively simple and inexpensive manner.

The invention is based on an adaptation of a domain wall memory of the type described in copending application Ser. No. 579,902, filed Sept. 16, 1966 for H. E. D. Scovil and in copending application Ser. No. 601,692, filed Dec. 14, 1966 for U. F. Gianola, and provides, in one aspect, an improved readout for that type of memory.

SUMMARY OF THE INVENTION

The advantages of this invention are realized in one embodiment thereof wherein binary ones and binary zeros are represented by domain walls in first and second positions, respectively, in bit locations defined along domain wall wires in a "real" bit plane. Such an arrangement is disclosed in the aforementioned copending Scovil application. In the present arrangement, each bit in memory has associated with it a "0" (complementary) plane as well as a "1" (conventional or real) plane. When information is written into a bit location in a real plane in memory, the complement of each stored bit is stored, additionally, in the associated memory plane. The complement information is stored as a domain wall in the first and second positions of a bit location in the complementary plane representing a binary zero and a binary one, respectively. Binary zeros and binary ones then may be thought of also as domain walls in first positions in the 0 plane and in the 1 plane, respectively. A match character is applied to enable propagation fields to advance selectively any walls present in first positions in bit locations in the 0 and 1 planes depending upon whether the corresponding bit in the match character is a 1 or a 0, respectively. If any bit location has a match, no wall is present in a first position to be advanced. If a bit location includes a mismatched bit, a wall is present in a first position to be so advanced. The wires of all bit locations of a word form a conjunction at which a wall appears only when a mismatch occurs between stored information and the match character. The presence and absence of walls are complemented beyond the conjunction. Thus, a wall present after a complement operation represents a match word. This wall is advanced through a coded coupling arrangement in which it generates indications of the corresponding word address.

Accordingly, a feature of this invention is a magnetic wire memory organized such that corresponding bits of different words in memory are stored in bit planes and the wires in which the bits of a word are stored form a conjunction.

Another feature of this invention is a magnetic wire memory wherein corresponding bits of different words in memory are stored in associated real and complementary planes and the wires of the pairs of planes associated with corresponding bits also form a conjunction.

A further feature of this invention is means storing binary information and the complement thereof in wires of associated pairs of wire planes.

A still further feature of this invention is the extension of a domain wall common wire past the conjunction of the wires defining each word location and means coupled to those extensions in a coded manner and responsive to the passage of a domain wall past those couplings for generating the address of the corresponding word location.

Another feature of this invention is a content addressable memory wherein match information is applied in a manner to enable the selective advance of domain walls in a real plane or in a corresponding complementary plane at each bit location therein.

DETAILED DESCRIPTION

Figure 1:
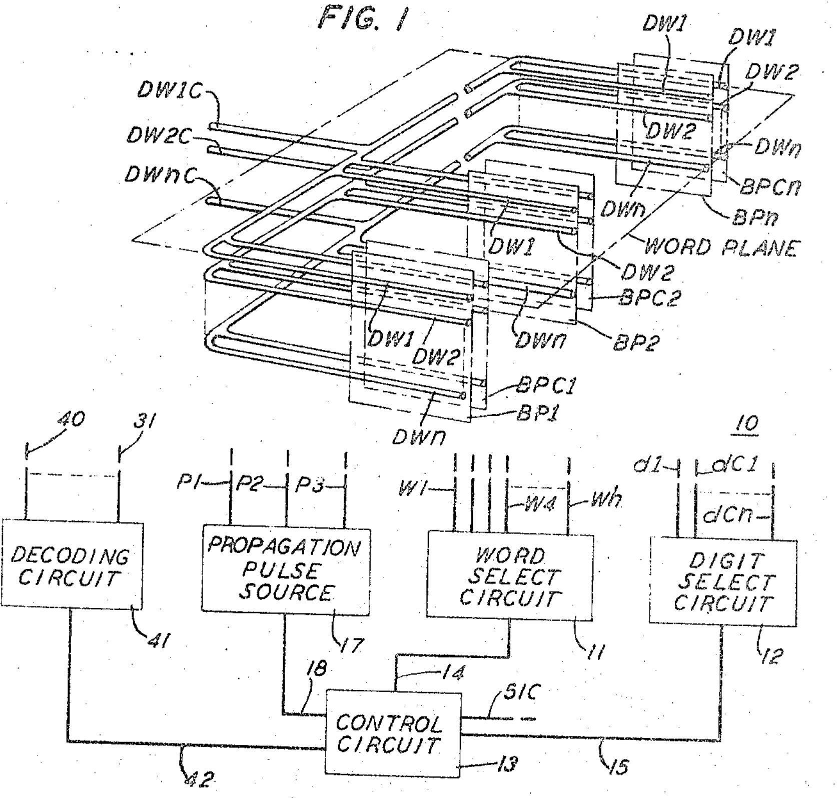
FIG. 1 is a schematic illustration of a memory in accordance with the invention.

FIG. 1 shows a memory 10 in accordance with this invention. The memory is shown organized in bit planes arranged vertically as represented by the broken block indications designated BP1, BP2, . . . BP*n*. The bit planes are shown in pairs, those already designated corresponding to conventional or real bit planes, those spacing apart the real (1) planes being the complementary planes for complementary information. The latter are designated, accordingly, BPC1, BPC2, . . . BPC*n*. The term "bit plane" commonly refers to the geometric plane of the locations of corresponding bits in different words in memory. Thus, bit plane BP1 stores all the first bits in all the words in memory while bit plane BP*n* stores all the *n*th bits. Similarly, bit planes BPC1 and BPC*n* store the complement of the first *n*th bits of all words in memory. A word plane then may be visualized here as comprising the corresponding bit locations in all the bit planes as indicated by the generally horizontal broken block designated "word plane."

The block indications permit the reader to visualize the memory and its orientation, but are not intended to indicate a specific structure. In the embodiment of FIG.

1, for example, a magnetic domain wall wire provides the bit location for each bit in memory. Thus, in bit plane BP1, domain wall wires DW1, DW2, . . ., and DW*n* provide bit locations for the first bits in an *n* word memory. Similarly, each of the other bit planes and the complementary bit planes include domain wall wires DW1, DW2, . . ., and DW*n* for the other bits in a word memory as indicated in FIG. 1.

In accordance with this invention, all the wires DW1, in both real and complementary planes, are brought together to a domain wall common wire in a manner such that a domain wall advanced in any wire DW1 passes into, or generates a corresponding wall in, the common wire. The manner of bringing the wires together in a suitable manner is discussed hereinafter. Similarly, the wires DW2, and the wires DW3 . . . are brought together. This is shown in FIG. 1 for wires DW1, DW2, and DW*n* connected to common wires designated DW1C, DW2C and DW*n*C. The connections of the remaining domain wall wires are omitted for clarity.

It is convenient to visualize the memory of FIG. 1 in three distinct sections. The first is the storage (address) portion comprising all the bit planes, as indicated by the broken blocks in FIG. 1, each essentially as disclosed in the aforementioned copending application of Scovil. The second section comprises all the domain wall wires in memory between the left edges of the bit plane block symbols in FIG. 1 to and including the conjunctions with the corresponding domain wall common wire. The third section comprises all the domain wall common wires beyond the conjunctions.

Figure 2:
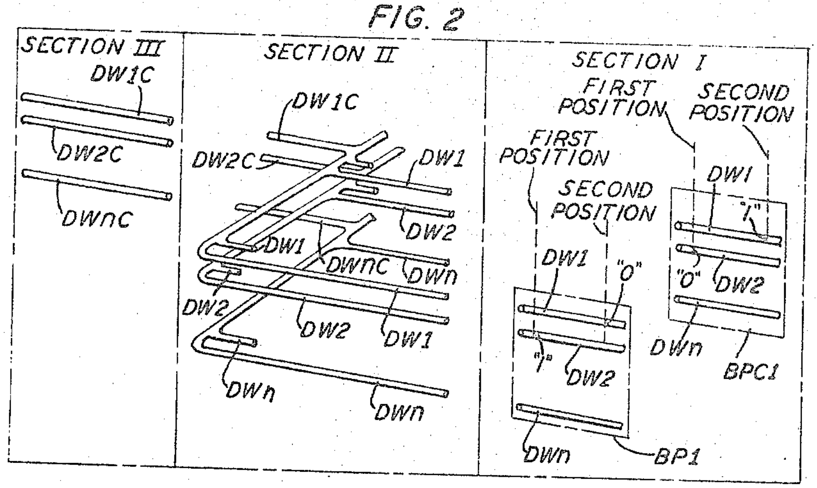
FIGS. 2, 3, 4, 5, 6, and 7 are schematic illustrations of portions of the memory of FIG. 1.

FIG. 2 is an exploded view of the three sections of the memory shown for bit plane BP1 and its complementary plane BPC1. Information is stored in each domain wall wire as a domain wall in a first or a second position. A domain wall in a first position in a real bit plane represents a binary one; a domain wall in a first position in the complementary plane represents a binary zero. A domain wall in a second position similarly represents a binary zero in a real bit plane and a binary one in the complementary bit plane. The positions for the walls representing binary ones and binary zeros in the wires of each of the bit planes and of the complementary planes are illustrated in section I of FIG. 2 in wires DW1 and DW2 of real bit plane BP1 and of complementary plane BPC1 and are discussed further during the description of the operation hereinafter.

The method of selectively moving walls from first to second positions and vice versa is disclosed in the aforementioned copending application of Scovil and is not fully discussed herein. It is merely accepted here that the walls may be moved in this manner. The means for so moving the walls is indicated as a plurality of word conductors W1, W2 . . . W*h*. The word conductors, indicated in FIG. 1, couple consecutive next adjacent portions of like domain wall wires in the bit planes in a like coded manner such that a coded sequence of pulses on conductors W*h* through W1 generate consecutive coded propagation fields to advance walls in only the domain wall wires defining bit locations of a selected word and in the associated complementary locations. The word conductors are connected between a word select circuit 11 and ground.

Whether or not a wall advances in response to the pulses applied to the word conductors depends upon digit information. For example, the word select conductor W*h* is spaced apart from second storage positions sufficiently so that a wall in a second position does not move when that word conductor is pulsed. Digit conductors *d*1, *dc*1, *d*2, *dc*2, . . . *dn*, *dcn* couple the wires of corresponding bit planes and complementary planes between the second positions and the positions coupled by word conductor W*h*. Only after digit conductors are pulsed are walls positioned to be advanced, by word pulses, to first positions in the wires of the selected word. The digit conductors are connected between a digit select circuit 12 and ground.

The word and digit selected circuits are connected to a control circuit 13 via conductors 14 and 15, respectively. The domain wall wires of each bit plane are extended beyond section I of FIG. 2 into sections II and III. The extension of each of the domain wall wires is coupled by conventional propagation means including first and second propagation conductors P1 and P2 driven, illustratively, by a two-phase propagation pulse source 17. Conductors P1 and P2 and pulse source 17 are shown in FIG. 1. The mode of coupling between each domain wall wire and the propagation conductors is well known and not discussed further. Propagation pulse source 17 is connected to control circuit 13 via conductor 18. An additional propagation conductor P3 also shown in FIG. 1 connected to source 17 is discussed hereinafter.

Figure 3:
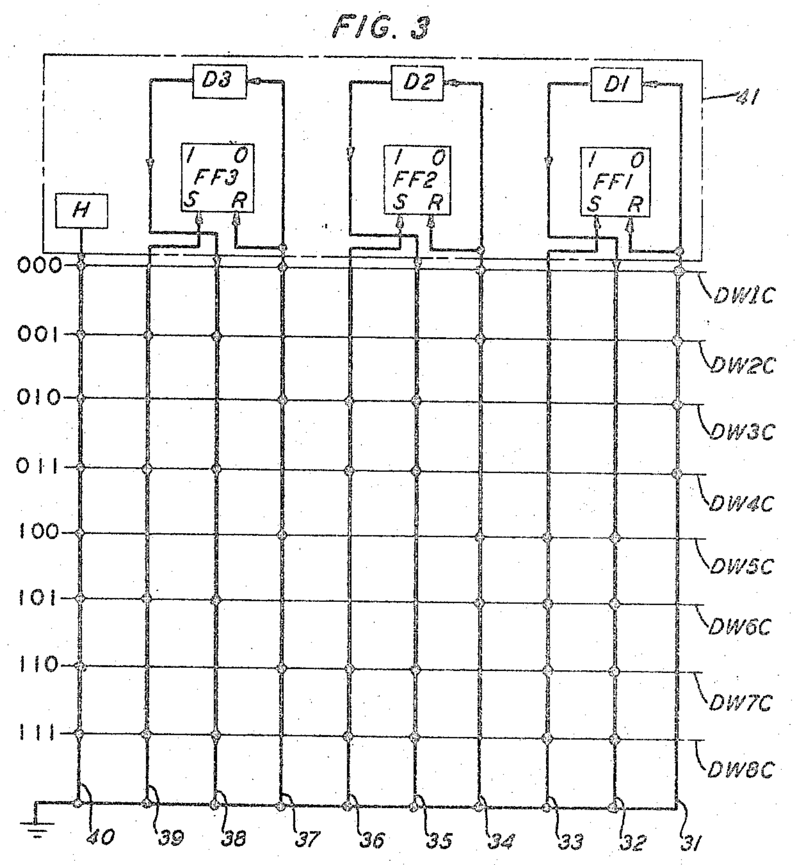

The extensions of the domain wall wires shown in section III of FIG. 2 are also coupled by a decoding network shown schematically in FIG. 3 for eight of the domain wall common wires of FIG. 1. The domain wall wires are shown as horizontal lines designated, to the right as viewed, to conform to the designations of the wires which they represent. The vertical lines in FIG. 3 represent conductors coupled in a coded manner to the domain wall wires. Illustratively, ten conductors are shown in FIG. 3 and are designated 31, 32, . . . and 40. The conductors are connected between a decoding circuit represented by block 41 in FIG. 1 and shown in more detail in FIG. 3 as will be discussed. Decoding circuit 41 is connected to control circuit 13 via a representative conductor 42 of FIG. 1.

The coupling between the conductors 31 through 40 and the domain wall wires in section III of FIG. 2 as illustrated in FIG. 3 is represented by dots. That is to say, if the wires are coupled by a conductor, a dot is shown at the intersection. If the wire is not coupled, no dot is shown. A binary coded scheme is shown illustratively.

In more detail, conductor 31 couples each of domain wall wires DW1C through DW4C and conductor 32 couples the remaining wires DW5C through DW8C. Similarly, conductors 34 and 35 couple odd and even pairs of adjacent domain wall wires respectively. For example, conductor 34 couples domain wall wires DW1C and DW2C, which constitute a first odd pair, and wires DW5C and DW6C, which constitute a second odd pair. Conductor 35 couples wires DW3C and DW4C and wires DW7C and DW8C constituting first and second even pairs. Conductors 37 and 38 couple the odd and even numbered domain wall wires respectively. Conductor 40 couples all the domain wall wires. Conductors 33, 36, and 39 couple the domain wall wires as do conductors 32, 35, and 38, respectively. The reason for this duplicate coupling will become clear from a discussion of the operation of the decoding circuit 41, the organization of which is discussed now in connection with FIG. 3.

Decoding circuit 41, as shown in FIG. 3, includes three flip-flops FF1, FF2 and FF3 for the illustrative eight wire arrangement. Conductors 31 and 33 are connected to the zero and one inputs of flip-flop FF1, respectively. Similarly, conductors 34 and 36 are connected to the zero and one inputs of flip-flop FF2 and conductors 37 and 39 are connected to the zero and one inputs of flip-flop FF3. Conductors 31, 34, and 37 are also connected to inputs of inhibit drivers D1, D2, and D3. The outputs of drivers D1, D2, and D3 are connected to ground via conductors 32, 35, and 38. No outputs for flip-flops FF1, FF2, and FF3 are described. Such outputs would be present in practice for operating indicators for the addresses of match words or, alternatively, for enabling (gating) logic circuitry for direct readout of match information. Such indicators and logic circuitry are well known and a discussion thereof is unnecessary for an understanding of this invention. The address indications of matches in memory are represented herein merely by a recitation of the state of the flip-flop in an illustrative operation hereinafter. In practice, flip-flops FF1, FF2, and FF3 are typically preceded by strobing and amplifying circuitry not shown.

Conductor 40 is connected between a hold driver H and ground as shown in FIG. 3.

The portions of the domain wall wires of section III of FIG. 2 are coupled by the conventional propagation means, as has already been stated, but in a sense opposite to that of the coupling to the wires of section II as will become clear.

The organization of an illustrative memory in accordance with this invention has been described. The general operation of that memory including a description of the complement operation and the implementation thereof is now discussed followed by a specific illustrative operation.

We have mentioned previously that binary ones and zeros are stored in first and second positions in domain wall wires in a real bit plane and in opposite positions in complementary planes. This is illustrated in section I of FIG. 2 for bit plane BP1 and for complementary plane BPC1 as indicated by the domain walls identified as "1" and "0" there. A binary one may be thought of as represented by a wall to the left of a wire in a real bit plane in section I while a binary zero may be thought of as represented by a wall to the left of a wire in a complementary bit plane of section I as viewed. The walls so shown are considered to be in first positions, then, and all walls in such first positions in memory are responsive to any propagation fields induced in extensions of the corresponding domain wall wires shown in section II of FIG. 2.

The word to be matched controls whether those propagation fields are generated in a wire of a real bit plane or, alternatively, in a wire of the complementary plane associated with that bit plane for each bit in memory. Thus, if a binary one in a particular bit location is sought, the corresponding bit of the match character enables propagation fields to advance a wall in a first position in the associated wire of the corresponding complementary plane. If a binary zero is stored in a particular bit location, a wall is present in the associated wire of the complementary plane. That wall is advanced by the so applied propagation field and a mismatch is indicated by the presence of the wall. If a binary one is stored in the particular bit location under consideration, no wall is present in the corresponding wire of the complementary plane to be so advanced and a match is indicated.

Figure 4:
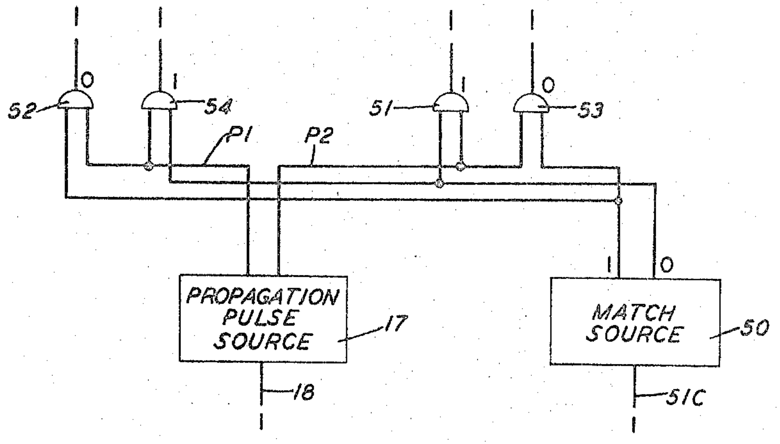

FIG. 4 shows in detail a portion of the logic circuit by means of which propagation fields are induced in a wire of a bit location in a real plane or in the associated wire in the complementary plane. Specifically, corresponding bit locations of the word locations in memory (i.e., in a selected real and complementary bit plane pair) have associated with them an output terminal pair of a match source 50. An illustrative terminal pair is designated by a 1–0 notation to correspond to binary one and binary zero indications. The 1 terminal is connected to an input of each of AND circuits 52 and 53. The 0 terminal, similarly, is connected to an input of each of AND circuits 51 and 54. The P1 conductor in FIG. 4 also is connected to an input of each of AND circuits 52 and 54 whereas the P2 conductor is connected to an input of each of AND circuits 51 and 53.

Match source 50 provides an output either on its 0 or on its 1 terminal. It is clear then that a 0 output from source 50 enables AND circuits 51 and 54. Propagation pulses applied in coincidence to conductors P1 and P2 appear as outputs of those AND circuits which are connected to wires in the corresponding real bit plane as designated by the 1 indications at those outputs. Similarly, a 1 output from source 50 enables AND circuits 52 and 53 directing propagation pulses to the wires of the corresponding complementary bit plane as indicated by the 0 indications at those outputs. In this manner, source 50 provides a signal which is the complement of the sought-after stored bit. Only when a stored bit matches that complementary output is no wall advanced through the wire of section II, FIG. 2, associated with that bit location. If a (bit) mismatch occurs, however, a wall is advanced through a corresponding one of those wires. Source 50 is connected to control circuit 13 of FIG. 1 via conductor 51 to this end.

A circuit as shown in FIG. 4 is required for each pair of real and complementary bit planes.

Let us consider the two possible cases in detail. First, a bit mismatch occurs and a wall appears in a domain wall wire in section II of FIG. 2 to be advanced therealong in response to the propagation fields towards the associated common wire. Conjunctions are encountered by the advancing wall. To this end, conjunctions between magnetic wires need not comprise a physical joining of the wires but need only comprise wires in proximity as disclosed in copending patent application Ser. No. 507,-498, filed Nov. 12, 1965 (Patent No. 3,447,141) for J. T. Sibilia and D. H. Smith. The wires may, of course, be physically in contact or even welded together for enabling a domain wall in one wire to give rise to a domain wall in the other. If magnetic films on planar substrates are used, the films merely need to be deposited in a geometry to permit fan-out, as is well known in the art and described hereinafter. Whatever the implementation employed, propagation fields advance a domain wall to such a conjunction for each bit mismatch in a word.

The occurrence of more than one bit mismatch in a word presents no difficulties because the passage of a single wall in a domain wall common wire signifies that the magnetization in the common wire reverses and that additional walls are, then, of a polarity to be absorbed. We may just accept that if a stored word has at least one bit mismatch, a domain wall appears at a conjunction of the magnetic wires of a word in section II of FIG. 2.

The second possible case is that no bit mismatch occurs and no domain wall is present to be advanced by propagation pulses toward a domain wall common wire in section II.

It is now desired to complement (or invert) the information in section II of FIG. 2 before it is advanced into section III. That is to say, for each advancing wall, the absence of a wall is substituted, and for each absent wall, a wall is substituted.

Figure 5:
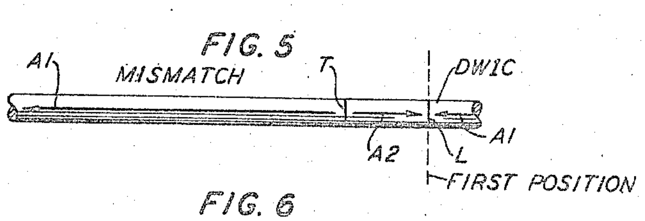
Figure 6:
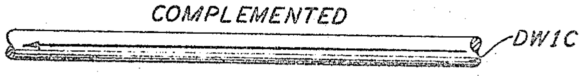
Figures 7, 8:
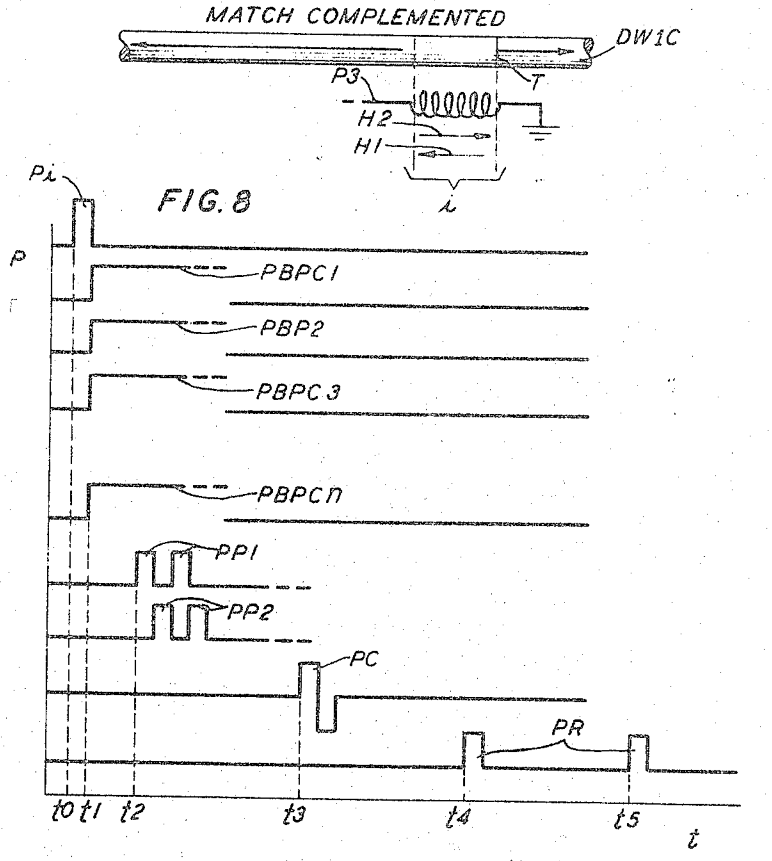
FIG. 8 is a pulse diagram of the operation of the memory of FIG. 1.

One convenient way for insuring such a complementing operation is to initialize the domain wall wires of section III of FIG. 2 to a direction of magnetization parallel to the direction of magnetization in section I (with a wall representing a stored 1 being in a first position) as represented by the arrow A1 in FIG. 5. In addition, the wires in section II are initialized to a direction antiparallel to the direction of magnetization in section I as represented by the arrow A2 in FIG. 5. In this manner, a domain wall T is formed in each domain wall common wire. A domain wall L representing information, then, is advanced as described, while the wall T is illustratively stationary. The arrow A2 then may be thought of as representing a reverse magnetized domain having leading and trailing walls L and T, respectively. If the wall L is present to be advanced as described, it is annihilated when it approaches the wall T. On the other hand, if the wall L is not present (indicating a match bit), the wall T remains. In the first instance, no walls remain as shown in FIG. 6; in the second instance, the wall T remains as shown in FIG. 7.

The illustrative complement operation just described requires wall T to be stationary. Propagation fields applied for moving wall L, however, would also move wall T. In order to avoid moving wall T, the propagation couplings are absent from the common wires at the positions of each wall T. Such positions are the positions for the complement (or invert) operation and are represented for wire DW1C in FIG. 7 by the broken vertical lines defining the position designated *i* in that figure.

An additional conductor P3 couples the position *i* in each of the common wires and provides fields H1 and H2, under the control circuit 13 via pulse source 17 to which it s connected as shown in FIG. 1. The field H1 moves a wall L to the left as shown in FIG. 5 for annihilating walls L and T in pairs and the field H2 moves a remaining wall T into a position such that the wall is advanced further to the left in response to additional propagation pulses. To this end, of course, conductors P1 and P2 of FIG. 1 couple section III of FIG. 2 in a sense opposite to that necessary to advance wall L to the left as viewed in FIG. 2.

Alternatively, and even more simply, sections II and III along each domain wall wire as shown in FIG. 2 are initialized to a first magnetization direction (arrow A2 in FIG. 5). After operation of the memory advances walls or the absence of walls past corresponding conjunctions, section III is reversed to a second direction of magnetization (arrow A1 in FIG. 5). If a wall were present, it is annihilated. If a wall were absent, it is provided. The complementing operation is again implemented.

It is clear at this juncture in the description that each match between a match character and a word in memory is represented by a domain wall T in one of the common wires, for example wire DW1C, of section III of FIG. 2. A mismatch is represented by the absence of a wall T. The movement of match information in this form through the decoding network shown in FIG. 3 generates the addresses of all match information either for controlling later interrogation of the memory or for permitting direct readout of only match words. Circuitry for implementing either output operation is well understood in the art and an explanation thereof is unnecessary for an understanding of this invention. Such circuitry may be considered included within the block 13 of FIG. 1 representing the control circuitry.

Consider a domain wall T as shown in FIG. 7 being advanced along an illustrative common wire DW1C as shown in FIG. 2. Such a wall induced a pulse in conductor 31 of FIG. 3. The induced pulse resets flip-flop FF1 to a 0 state and activates inhibit driver D1. In turn, driver D1 maintains a drive on conductor 32 for inhibiting the passage of walls in domain wall common wires DW5C, DW6C, DW7C, and DW8C coupled thereby.

Domain wall T is further advanced along wire DW1C to induce a pulse in conductor 34 thus resetting flip-flop FF2 to a 0 state and activating inhibit driver D2. Inhibit driver D2 drives conductor 35 inhibiting the advance of domain walls past the couplings between conductor 35 and wires DW3C, DW4C, DW7C, and DW8C. Domain wall T is further advanced to induce a pulse in conductor 37 resetting flip-flop FF3 to 0 and activating inhibit driver D3. Inhibit driver D3 drives conductor 38 inhibiting the advance of walls in wires DW2C, DW4C, DW6C, and DW8C.

Hold driver H, which is conveniently a DC source, drives conductor 40 generating in each common wire a field for advancing a wall thereby to the left as viewed in FIG. 3.

A 000 address thus is generated to correspond to a match in the word location corresponding to common wire DW1C. Any other walls being advanced along other common wires are stopped in the encoding matrix by the fields generated via the drives from inhibit drivers. Such walls are returned to the right to corresponding conjunctions via fields of propagation levels applied for resetting the wires of section III of FIG. 2. The inhibit drivers are reset and movement through the encoding circuit is repeated until the address of each match in memory is provided.

Field generating means (not shown) provide the resetting and initializing fields under the control of control circuit 13 of FIG. 1. Such means may comprise flat strip solenoids, for example, as is well known in the art and are in no need of further elaboration herein. Flat strip solenoids useful in this connection are shown in the aforementioned Scovil application.

The various drive and control circuits, as well as the decoding circuit and pulse sources may be any such elements capable of operating in accordance with this invention.

We have now described the organization of an illustrative memory in accordance with this invention, as well as a general description of the operation thereof. A specific description of the operation in terms of illustrative stored words and the search for matches amongst those words is now undertaken. The operation is described in connection with a pulse diagram of FIG. 8. FIG 3 shows a decoding network including a modified binary arrangement for an illustrative eight words in memory. Accordingly, the illustrative operation is described in terms of eight stored words of which a random three are matches. The words 101 . . . 1, 010 . . . 0, 000 . . . 1, 001 . . . 1, 010 . . . 0, 101 . . . 1, 011 . . . 1, and 101 . . . 1 are considered stored in word locations associated with common wires DW1C . . . DW8C, respectively. Portions of the stored words are omitted to simplify the discussion. It is to be understood that whatever the omitted bits are they are taken to correspond to the omitted bits in the match character for the purposes of this illustration. The complements of those words are stored in the complementary locations. For example, the word 101 . . . 1 is stored in the wires DW1 of planes BP1, BP2, BP3 (not shown) . . . , and BP*n*. The complementary information 010 . . . 0 is stored in wires DW1 of planes BPC1, BPC2, BPC3 (not shown) . . . , and BPC*n*. Remember that a 1 is represented by a domain wall as shown to the left in wire DW2 of bit plane BP1 in section I of FIG. 2, whereas a 0 is represented in a wire in the complementary plane by a wall in precisely that same position.

The appropriate bit of the match character is applied to advance a wall in a first position in the real plane or in the complementary plane at each bit location. The match information, then, is applied in accordance with the following truth table:

| Match bit | 0 | 0 | 1 | 1 | "Don't care" |
|---|---|---|---|---|---|
| Representative stored bit | 0 | 1 | 0 | 1 | 0 or 1. |
| Position of wall in real plane | 2nd | 1st | 2nd | 1st | 2nd or 1st. |
| Position of wall in complementary plane | 1st | 2nd | 1st | 2nd | 1st or 2nd. |
| Plane driven | Real | Real | Com | Com | Neither. |
| Wall moved | No | Yes | Yes | No | No. |

The correspondence between the match character and a stored word may, of course, be thought of as direct rather than complementary depending on the design of the circuitry and thus is entirely a matter of choice. In order to avoid "bookkeeping" errors, however, the described complementary relationship will be maintained throughout the remainder of the description.

A match source 50 then provides a complement of each corresponding bit in the desired match character. The desired match word is taken to be 101 . . . 1. Accordingly, the applied word from match sources 50 is 010 . . . 0 where each binary 1 or 0 of the (complementary) applied match character activates corresponding AND circuits 52 and 53 or 51 and 54 of FIG. 4, respectively. The initializing pulse P*i* is shown at time *t*0 in FIG. 8. The match character is initiated at a time *t*1 in FIG. 8. Both are under the control of control circuit 13 of FIG. 1. The initial conditions as described in connection with FIG. 5 are established.

In accordance with the applied match character, voltage levels PBPC1, PBPC3, and PBPC*n* (*t*1 in FIG. 8) are maintained on an input to each of AND circuits 51 and 54 associated with each of the complementary bit planes BPC1, BPC3, and BPC*n*, and voltage levels PBP2 . . . are maintained on inputs to each of AND circuits 52 and 53 of bit planes BP2 . . . . The thus enabled AND circuits respond to propagation pulses applied via source 17 of FIG. 1 under the control of control circuit 13 to provide propagation fields in each domain wall wire in the corresponding complementary and real bit plane according to the state of the AND circuits 51, 52, 53, and 54 associated with each bit plane pair. For bit plane pair BP1 and BPC1, propagation fields are generated in wires DW1 . . . DW*n* of the complementary 0 plane BPC1; for bit plane pair BP2 and BPC2, propagation fields are generated in wires DW1 . . . DW*n* of the real plane BP2, and so forth.

The sought after stored word is 101 . . . 1. Each wire in complementary bit plane BPC1 having a 1 stored has a wall absent from the first position there and thus no wall is advanced in response to propagation fields. Similarly, each wire in real bit plane BP2 storing a 0 has no wall present for propagation. It is clear then that each match source 50 enables propagation pulses to generate fields in only selected domain wall wires. But no walls are present to be affected by those fields in the ones of those wires in which a match bit is stored. On the other hand, if a bit mismatch occurs, a wall is present in the corresponding wire for propagation. The propagation pulses are shown initiated at time *t2* in FIG. 8 via source 17 under the control of control circuit 13 of FIG. 1 as represented by the pulse forms PP1 and PP2 in FIG. 8.

The walls representing bit mismatches are advanced toward corresponding conjunctions forming a single wall in the corresponding common wire there representing a mismatched word. In the wires DW1, DW6, and DW8 (corresponding to the matched words) no walls advance and, thus, no mall arrives at the corresponding conjunction. The complementing operation takes place at those conjunctions in a manner already described in connection with FIGS. 5 through 7 in response to a bipolar pulse PC on conductor P3 at a time *t3* at which all possible walls would have advanced to position *i*. Propagation continues and walls T now representing only stored words corresponding to the match character remain to be advanced, those along common wires DW1C, DW6C, and DW8C. The remaining common wires are free of advancing walls.

At this junction in the operation, a domain wall (T of FIG. 7) in each of wires DW1C, DW6C, and DW8C, enters the decoding matrix of FIG. 3. As described before, the wall in wire DW1C generates a pulse in conductor 31 inhibiting the movement of walls in wires DW5C through DW8C past conductor 32. The pulse in conductor 31 also drives flip-flop FF1 to the 0 condition (indication). The walls in wires DW6C and DW8C are stopped; the wall in wire DW1C advances, as described hereinbefore, to provide a 000 address indication. The most to least significant digits are read from right to left as shown in FIG. 3. If this address is not to be employed directly it is to be transferred to storage means (not shown) in a well known manner before a next subsequent address is generated.

At a time *t4* in FIG. 8 a field is generated, conveniently by a flat solenoid (not shown) under the control of control circuit 13 to return walls, which have not passed completely through the decoding network, to the right as viewed in FIG. 3. The walls in wires DW6C and DW8C (FIG. 3) are returned in this manner. The returning field is represented by the pulse form PR shown at time *t4* in FIG. 8 and functions, in addition, by conventional means not shown, to deactivate inhibit driver D1. Conveniently, the propagation conductors may be used to provide the returning field and may, accordingly, be connected to inputs of the inhibit drivers. The propagation fields are inhibited during the provision of the returning field.

At the termination of the returning field, the propagation pulses again advance walls in common wires DW6C and DW8C. Each of those walls generates a negligible pulse in conductor 32 and also induces a pulse in conductor 33 which drives flip-flop FF1 to a 1 condition (indication). The wall in wire DW6C then induces a pulse in conductor 34 driving flip-flop FF2 to the 0 condition and activates inhibit driver D2. Flip-flop FF2 is already in the zero condition and no change occurs. Inhibit driver D2, in response to the pulse in conductor 34, pulses conductor 35 inhibiting the advance of the wall in wire DW8C.

The wall in wire DW6C (FIG. 3) continues to advance inducing a negligible pulse in conductor 37 and a pulse in conductor 39 for driving flip-flop FF3 to a 1 condition and for activating inhibit driver D3 for pulsing conductor 38. No other walls are advancing to be inhibited by the pulse on conductor 38 in the illustrative operation The wall in wire DW6C advances to a position in which it is held via the hold driver. The address generated then is 101 as shown in FIG. 3.

At a time *t5*, another return pulse PR is applied to return remaining walls to the right as viewed in FIG. 3. Again, propagation fields advance remaining walls through the decoding network. Only one wall remains in accordance with the illustrative operation. That wall, advancing along wire DW8C, generates the address 111 again as shown in FIG. 3.

The process repeats until no additional addresses are generated or, alternatively, no additional stored words "gate" themselves out of memory via conventional logic circuitry designed for this purpose. To this end, an advancing wall induces a pulse in conductor 40. In the absence of such a pulse, operation is terminated via control circuit 13. Conductor 40 is conveniently connected to control circuit 13 via means, not shown, for this purpose.

Walls where advanced in the match operation described are recreated in initial storage positions by a pulse of a nucleating level, characteristic of the magnetic material employed, applied to initializing solenoids (not shown). Such a pulse generates in the wires of section III of FIG. 2 nucleating fields directed oppositely to fields simultaneously generated in the wires of section II. Only those wires in which walls most recently had been moved are in magnetization direction to switch. Thus walls are rstored to initial storage positions. Control circuit 13 may be considered to include circuitry for operating initializing solenoids in this manner.

Operation ceases under the control of control circuit 13 when all matches are acquired as described. Each match in memory is acquired by moving a wall essentially only 2 Z positions where $2^Z$ thus is the number of words in memory. M matches, then, are acquired in essentially only 2 MZ moves. The address so generated for a match in any word location as shown in FIG. 3 is indicated to the left in FIG. 3 as viewed.

It is to be understood that the match "character" may correspond to only portions of stored words in a manner to gate out associated stored information, as is well known. The invention imposes no limitation on the bits which may be included in the match character.

Figure 9:
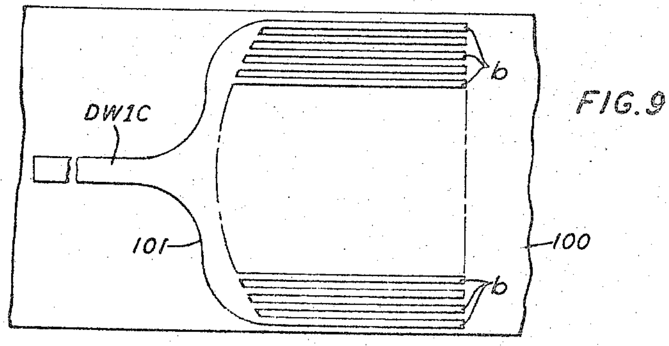
FIG. 9 is a portion of an alternative implementation in accordance with this invention.

The invention is described in terms of magnetic wires in which reverse domains are generated in response to nucleation fields in excess of a characteristic nucleation threshold and in which domain walls are moved in response to propagation fields in excess of a propagation threshold and less than the nucleation threshold. It is to be understood, however, that other implementations such as magnetic films are equally useful. For example, FIG. 9 shows a portion of a substrate 100 on which a thin magnetic film 101 is deposited in a form to provide fan-in of information, as already described for wires. In the form shown, each of the various branches *b* corresponds to a storage domain wall wire of FIG. 1. The various branches may correspond, for example, to the wires DW1 of a word in memory terminating in the thin film equivalent of common wire DW1C of section III in FIG. 2. A single substrate conveniently houses a number of such forms, each corresponding to a loction for a stored word in a manner to permit simple drive conductor layout. Propagation channels of a type useful in accordance with this invention also may be formed in a manner compatible with the teachings of copending application Ser. No. 579,931, filed Sept. 16, 1966 for A. H. Bobeck, U. F. Gianola, R. Sherwood, and W. Shockley (now patent 3,460,116) and of copending application Ser. No. 579,995, filed Sept. 16, 1966 for P. C. Michaelis (now Patent 3,454,939).

Regardless of the form of a memory in accordance with this invention, an encoding circuit as shown in FIG. 3 provides location information for matched words. The illustrative decoding arrangement is basically a binary arrangement, as is recognized when the circuit is visualized with conductors 33, 36, and 39 absent. The aforementioned copending application of H. E. D. Scovil discloses a binary arrangement of conductors for selectively moving (storing) domain walls from 0 to 1 positions, and vice versa, in a set of domain wall wires. The various (word select) conductors employed for initially moving domain walls for storage may comprise corresponding wires in the decoding network enabling simplification of the requisite wiring patterns. In this connection, decoding circuit 41 of FIG. 3 may be visualized as a utilization circuit requiring only a slight modification of the word selection circuitry to include additional conductors 33, 36, and 39 for operation.

What has been described is considered only illustrative of the principles of this invention. Accordingly, various modifications may be made therein by one skilled in the art without departing from the spirit and scope of the invention.

What is claimed is:

1. A content addressable memory comprising a plurality of first and associated second sets of propagation channels, means for storing binary ones and zeros in first and second positions, respectively, in each of said channels in said first sets of propagation channels, means for storing binary zeros and ones in first and second positions, respectively, in each of said channels in said second sets of propagation channels in a manner to complement information stored in associated first channels, means for organizing corresponding ones of said channels in said plurality of first and associated second sets of propagation channels into word locations, means responsive to coded input signals for advancing, selectively, only binary ones and zeros stored at first positions in said channels of said plurality of first and associated second sets of propagation channels, and means responsive to the absence of movement of binary zeros and ones in all of the channels of each word location for providing the address of each said word location in which the said absence of movement occurs.

2. A content addressable memory in accordance with claim 1 wherein each of said propagation channels comprises a magnetic domain wall wire and said binary ones and zeros comprise first domain walls at first and second positions, respectively, in each wire of said first sets of wires and first domain walls at said second and first positions, respectively, in each wire of said second sets of wires.

3. A content addressable memory in accordance with claim 1 wherein said propagation channels are defined in a single magnetic medium and said binary ones and zeros comprise first domain walls at first and second positions, respectively, in each channel of said first sets of channels and first domain walls at said second and first positions, respectively, in each channel of said second sets of channels.

4. A content addressable memory in accordance with claim 2 wherein said means responsive to coded input signals includes means for generating propagation fields for advancing first domain walls at only first positions in corresponding wires and switching means responsive to input signals enabling those fields to be generated selectively in said first set of wires and in the associated wires of said second set of wires.

5. A content addressable memory in accordance with claim 4 wherein the wires of a word location in said first set of wires and the associated wires of said second set of wires form a conjunction.

6. A content addressable memory in accordance with claim 5 wherein said means responsive to the absence of the movement of a domain wall includes a common wire at the conjunction of the wires of each word location, and means for defining in each of said common wires a second domain wall of a type to annihilate a first domain wall being advanced from a first position in a bit location.

7. A content addressable memory in accordance with claim 6 including means for advancing said second domain walls in said common wires.

8. A content addressable memory in accordance with claim 7 wherein said means responsive to the absence of a domain wall further includes a decoding network coupled to all said common wires for providing the address of the word location associated with each common wire in which a second domain wall is being advanced.

9. A content addressable memory comprising means for storing binary ones and zeros, respectively, as domain walls in first and second positions in first shift register channels, means for storing binary zeros and ones, respectively, as domain walls in first and second positions in second shift register channels associated with said first channels in a manner to complement information stored in the latter, means responsive to coded signals corresponding to a match word for advancing only domain walls in first positions in selected first and second channels corresponding to said coded signals thus advancing a domain wall for each mismatch between stored binary ones and zeros and said coded signals, means for complementing the presence and absence of domain walls at complement positions in each of prescribed sets of said channels, and code means for generating the address corresponding to each wall provided by said last-mentioned means.

10. A content addressable memory comprising a plurality of first and associated second sets of propagation channels, means for storing binary ones and zeros in first and second positions, respectively, in each of said channels in said first sets of propagation channels, means for storing binary zeros and ones in first and second positions, respectively, in each of said channels in said second sets of propagation channels in a manner to complement information stored in corresponding associated first channels, and means responsive to coded signals for advancing only domain walls in first positions in selected first or associated second channels corresponding to said coded signals.

References Cited

UNITED STATES PATENTS 3,299,413 1/1967 Snyder ............ 340—174

BERNARD KONICK, Primary Examiner

GARY M. HOFFMAN, Assistant Examiner